US012634909B2

(12) United States Patent
Wang et al.

(10) Patent No.: US 12,634,909 B2
(45) Date of Patent: May 19, 2026

(54) BWP CONFIGURATION METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Haitao Li, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 527 days.

(21) Appl. No.: 18/064,673

(22) Filed: Dec. 12, 2022

(65) Prior Publication Data
US 2023/0116565 A1 Apr. 13, 2023

Related U.S. Application Data

(63) Continuation of application No. PCT/CN2020/095993, filed on Jun. 13, 2020.

(51) Int. Cl.
*H04W 72/0457* (2023.01)
*H04W 72/23* (2023.01)
*H04W 72/232* (2023.01)

(52) U.S. Cl.
CPC ..... *H04W 72/0457* (2023.01); *H04W 72/232* (2023.01); *H04W 72/23* (2023.01)

(58) Field of Classification Search
CPC ........... H04W 72/044; H04W 72/0457; H04W 72/232; H04W 72/23

(Continued)

(56) References Cited

U.S. PATENT DOCUMENTS

2017/0048906 A1* 2/2017 Lee ........................ H04W 76/14
2020/0403761 A1* 12/2020 Nguyen ................ H04L 5/0094
(Continued)

FOREIGN PATENT DOCUMENTS

CN 109391935 A 2/2019
CN 109496455 A 3/2019
(Continued)

OTHER PUBLICATIONS

WIPO, International Search Report and Written Opinion for PCT/CN2020/095993, Feb. 24, 2021.
(Continued)

*Primary Examiner* — Asad M Nawaz
*Assistant Examiner* — Hugh Mark Ashley
(74) *Attorney, Agent, or Firm* — Hodgson Russ LLP

(57) ABSTRACT

Provided are a BWP configuration method and apparatus, a terminal device, and a network device. The method comprises : a terminal device receiving first configuration information sent by a network device, wherein the first configuration information comprises a plurality of pieces of initial BWP configuration information, and each piece of initial BWP configuration information in the plurality of pieces of initial BWP configuration information is associated with one terminal type and/or terminal capability; and the terminal device selecting first initial BWP configuration information from among the plurality of pieces of initial BWP configuration information on the basis of the first configuration information, and residing on a first initial BWP on the basis of the first initial BWP.

19 Claims, 4 Drawing Sheets

The terminal device receives first configuration information sent by the network device, wherein the first configuration information includes plurality pieces of initial BWP configuration information, and each initial BWP configuration information in the plurality pieces of initial BWP configuration information is associated with a terminal type and/or a terminal capability — 201

The terminal device selects first initial BWP configuration information from the plurality pieces of initial BWP configuration information based on the first configuration information, and resides on the first initial BWP based on the first initial BWP — 202

(58) Field of Classification Search
   USPC ........................................................ 370/329
   See application file for complete search history.

(56)                         References Cited

U.S. PATENT DOCUMENTS

2021/0329718 A1*  10/2021  Hu ........................ H04W 72/23
2022/0287102 A1*   9/2022  Futaki .............. H04W 74/0833

FOREIGN PATENT DOCUMENTS

| | | |
|---|---|---|
| CN | 109561489 A | 4/2019 |
| CN | 110351854 | 10/2019 |
| CN | 110839248 A | 2/2020 |
| WO | 2019029510 A1 | 2/2019 |
| WO | 2019029518 | 2/2019 |
| WO | 2019096213 A1 | 5/2019 |

OTHER PUBLICATIONS

EPO, Extended European Search Report for EP Application No. 20939588.8, May 30, 2023.
CMCC, "Discussion on UE complexity reduction," 3GPP TSG RAN WG1 #101, R1-2003966, May 2020.
EPO, Communication for EP Application No. 20939588.8, Aug. 12, 2024.
CNIPA, Notice of Priority Examination for CN Application No. 202310514478.5, Jul. 31, 2024.
CNIPA, First Office Action for CN Application No. 202310514478. 5, Aug. 21, 2024.
EPO, Communication for EP Application No. 20939588.8, Feb. 15, 2024.

* cited by examiner

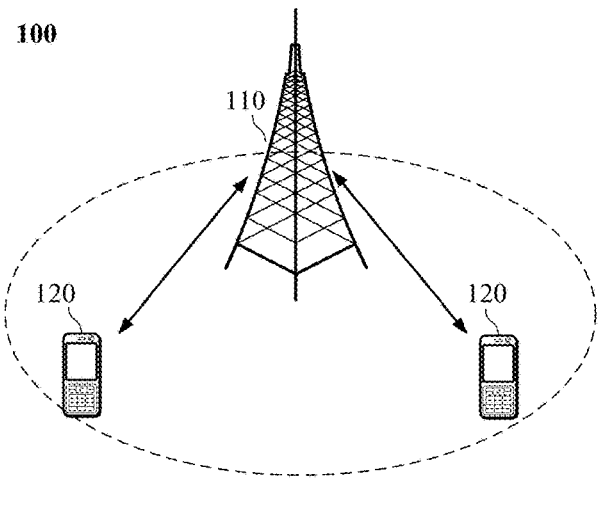

FIG. 1

The terminal device receives first configuration information sent by the network device, wherein the first configuration information includes plurality pieces of initial BWP configuration information, and each initial BWP configuration information in the plurality pieces of initial BWP configuration information is associated with a terminal type and/or a terminal capability    201

The terminal device selects first initial BWP configuration information from the plurality pieces of initial BWP configuration information based on the first configuration information, and resides on the first initial BWP based on the first initial BWP    202

FIG. 2

BWP CONFIGURATION METHOD AND APPARATUS, TERMINAL DEVICE, AND NETWORK DEVICE

CROSS REFERENCE

The present application is a continuation of International Application No. PCT/CN2020/095993, filed Jun. 13, 2020, the entire disclosure of which is incorporated herein by reference.

TECHNICAL FIELD

The embodiments of the present application relate to the field of mobile communication technologies, and in particular, to a bandwidth part (Band Width Part, BWP) configuration method and device, a terminal device, and a network device.

BACKGROUND

The NR-light type of terminal device was introduced in New Radio (NR) Release 17 (R17). Compared with the enhanced Mobile Broadband (eMBB) type of terminal device, the NR-light type of terminal device requires lower equipment cost and complexity.

SUMMARY

Embodiments of the present application provide a BWP configuration method and apparatus, terminal device, and network device.

The BWP configuration method provided by the embodiment of the present application includes:

receiving, by a terminal device, first configuration information sent by a network device, wherein the first configuration information includes a plurality pieces of initial BWP configuration information, and each piece of initial BWP configuration information in the plurality pieces of initial BWP configuration information is associated with a terminal type and/or a terminal capability; and selecting, by the terminal device, first initial BWP configuration information from the plurality pieces of initial BWP configuration information based on the first configuration information, and residing on a first initial BWP based on the first initial BWP configuration information.

The BWP configuration method provided by the embodiment of the present application includes:

sending, by a network device, first configuration information to a terminal device, wherein the first configuration information includes a plurality pieces of initial BWP configuration information, and each piece of initial BWP configuration information in the plurality pieces of initial BWP configuration information is associated with a terminal type and/or terminal capability;

wherein, the first configuration information is used for the terminal device to select first initial BWP configuration information from the plurality pieces of initial BWP configuration information, and to reside on the first initial BWP based on the first initial BWP configuration information.

The BWP configuration apparatus provided by the embodiment of the present application, applied to a terminal device, includes:

a receiving unit, configured to receive first configuration information sent by a network device, wherein the first configuration information includes a plurality pieces of initial BWP configuration information, and each piece of initial BWP configuration information in the plurality pieces of initial BWP configuration information is associated with a terminal type and/or a terminal capability; and a selecting unit, configured to select first initial BWP configuration information from the plurality pieces of initial BWP configuration information based on the first configuration information; and a residing unit, configured to reside on a first initial BWP based on the first initial BWP configuration information.

The BWP configuration apparatus provided by the embodiment of the present application, applied to a network device, includes:

a sending unit, configured to send first configuration information to a terminal device, wherein the first configuration information includes a plurality pieces of initial BWP configuration information, and each piece of initial BWP configuration information in the plurality pieces of initial BWP configuration information is associated with a terminal type and/or terminal capability;

wherein, the first configuration information is used for the terminal device to select first initial BWP configuration information from the plurality pieces of initial BWP configuration information, and to reside on the first initial BWP based on the first initial BWP configuration information.

The terminal device provided by the embodiment of the present application, includes: a processor and a memory. The memory is configured to store a computer program, and the processor is configured to invoke and execute the computer program stored in the memory, to perform the above BWP configuration method.

The network device provided by the embodiment of the present application, includes: a processor and a memory. The memory is configured to store a computer program, and the processor is configured to invoke and execute the computer program stored in the memory, to perform the above BWP configuration method.

The chip provided by the embodiment of the present application is configured to implement the above BWP configuration method.

In particular, the chip includes a processor configured to invoke and execute a computer program from a memory to cause a device on which the chip is installed to perform the above BWP configuration method.

The computer-readable storage medium provided by the embodiment of the present application is configured to store a computer program that causes a computer to perform the above BWP configuration method.

The computer program product provided by the embodiment of the present application includes computer program instructions that cause a computer to perform the above BWP configuration method.

The computer program provided by the embodiment of the present application, when being executed by a computer, causes the computer to perform the above BWP configuration method.

BRIEF DESCRIPTION OF THE DRAWINGS

The drawings described herein are used to provide further understanding of the present application and constitute a part of the present application. The schematic embodiments and descriptions of the present application are used to explain the present application and do not constitute an improper limitation of the present application. In the drawings:

FIG. 1 is a schematic diagram of a communication system architecture provided by an embodiment of the present application;

FIG. 2 is a schematic flowchart of a BWP configuration method provided by an embodiment of the present application;

DETAILED DESCRIPTION

Figure 3:
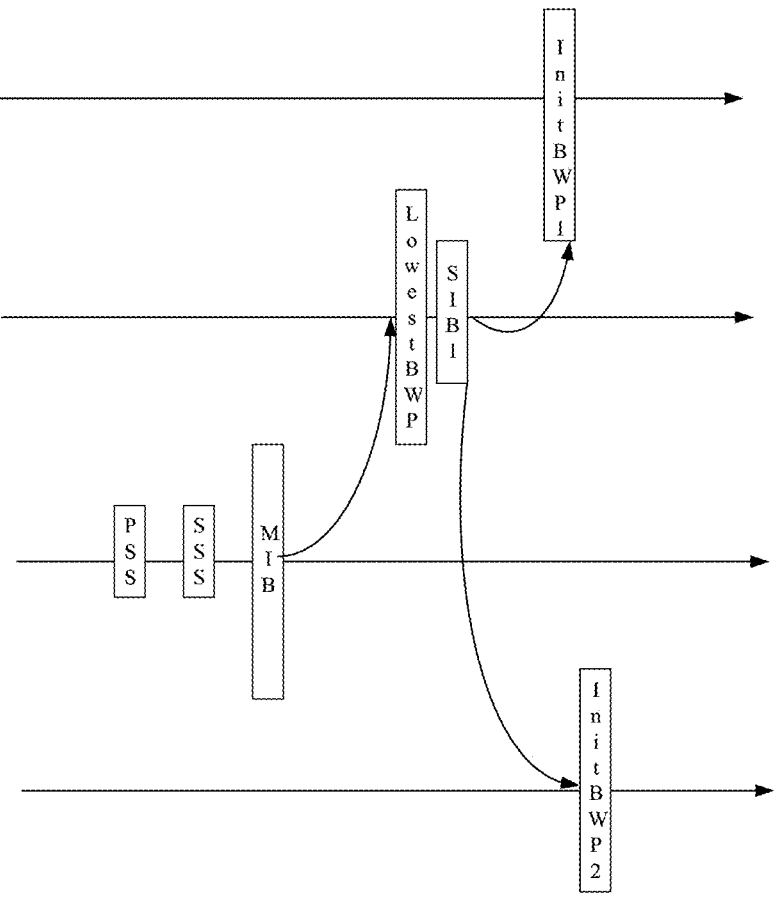
FIG. 3 is a principle diagram provided by an embodiment of the present application.

The technical solutions in the embodiments of the present application will be described below with reference to the accompanying drawings in the embodiments of the present application. Obviously, the described embodiments are part of the embodiments of the present application, not all of the embodiments. Based on the embodiments in the present application, all other embodiments obtained by those of ordinary skill in the art without creative efforts shall fall within the protection scope of the present application.

The technical solutions of the embodiments of the present application can be applied to various communication systems, for example, a Long Term Evolution (LTE) system, an LTE Frequency Division Duplex (FDD) system, an LTE Time Division Duplex (TDD), systems, 5G communication systems or future communication systems, etc.

For example, a communication system 100 to which this embodiment of the present application is applied is shown in FIG. 1. The communication system 100 may include a network device 110, and the network device 110 may be a device that communicates with a terminal 120 (or referred to as a communication terminal, a terminal). The network device 110 may provide communication coverage for a particular geographic area and may communicate with terminals located within the coverage area. Optionally, the network device 110 may be an evolved base station (Evolutional Node B, eNB or eNodeB) in an LTE system, or a radio controller in a cloud radio access network (Cloud Radio Access Network, CRAN). Alternatively, the network device may be a mobile switching center, a relay station, an access point, a vehicle-mounted device, a wearable device, a hub, a switch, a bridge, a router, a network-side device in a 5G network, or a network device in a future communication system.

The communication system 100 also includes at least one terminal 120 located within the coverage of the network device 110. "Terminal" as used herein includes, but is not limited to, a device configured to receive/transmit communication signal through wired connection, such as via Public Switched Telephone Networks (PSTN), Digital Subscriber Line (DSL), digital cable, a direct cable connection; and/or another data connection/network; and/or through a wireless interface, e.g., for cellular networks, Wireless Local Area Networks (WLAN), digital television networks such as DVB-H networks, satellite network, AM-FM broadcast transmitter; and/or another terminal; and/or an Internet of Things (IoT) device. A terminal configured to communicate through a wireless interface may be referred to as a "wireless communication terminal", "wireless terminal" or "mobile terminal". Examples of mobile terminals include, but are not limited to, a satellite or a cellular telephone; a personal communication systems (PCS) terminal that combine cellular radiotelephony with data processing, facsimile, and data communications capabilities; a PDA that may include radio telephones, pagers, Internet/Intranet access, web browsers, memo pads, calendars, and/or Global Positioning System (GPS) receivers; and a conventional laptop and/or palm-sized receivers or other electronic devices including radiotelephone transceivers. A terminal may refer to an access terminal, user equipment (UE), subscriber unit, subscriber station, mobile station, mobile site, remote station, remote terminal, mobile device, user terminal, terminal, wireless communication device, user agent, or user device. The access terminal may be a cellular phone, a cordless phone, a Session Initiation Protocol (SIP) phone, a Wireless Local Loop (WLL) station, a Personal Digital Assistant (PDA), a wireless Communication-enabled handheld devices, computing devices or other processing devices connected to wireless modems, in-vehicle devices, wearable devices, terminals in a 5G network or terminals in a future evolved PLMN, etc.

Optionally, Device to Device (D2D) communication may be performed between the terminals 120.

Optionally, the 5G communication system or 5G network may also be referred to as a new radio (New Radio, NR) system or an NR network.

FIG. 1 exemplarily shows one network device and two terminals. Optionally, the communication system 100 may include multiple network devices, and the coverage of each network device may include other numbers of terminals, which is not limited by the embodiment of the present application.

Optionally, the communication system 100 may further include other network entities such as a network controller and a mobility management entity, which are not limited in the embodiment of the present application.

It should be understood that, in the embodiments of the present application, a device having a communication function in the network/system may be referred to as a communication device. Taking the communication system 100 shown in FIG. 1 as an example, the communication device may include a network device 110 and a terminal 120 with communication functions, and the network device 110 and the terminal 120 may be the specific devices described above, which will not be repeated here. The device may further include other devices in the communication system 100, e.g., other network entities such as a network controller and a mobility management entity, which are not limited in the embodiment of the present application.

It should be understood that the terms "system" and "network" are often used interchangeably herein. The term "and/or" in this article is only an association relationship to describe the associated objects, indicating that there can be three kinds of relationships, for example, A and/or B may represent the three cases of A only, both A and B, and B only.

In addition, the character "/" in this disclosure generally indicates that the related objects are an "or" relationship.

In order to facilitate the understanding of the technical solutions of the embodiments of the present application, hereinafter, the technical solutions related to the embodiments of the present application are described.

In order to facilitate the understanding of the technical solutions of the embodiments of the present application, hereinafter, the technical solutions related to the embodiments of the present application are described.

With people's pursuit of speed, delay, high-speed mobility, energy efficiency, and the diversity and complexity of services in future life, the 3$^{rd}$ Generation Partnership Project (3GPP) international standards organization began to develop 5G. The main application scenarios of 5G are: Enhanced Mobile Broadband (eMBB), Ultra-Reliable Low-Latency Communications (URLLC), and Massive Machine-Type Communications (mMTC).

On the one hand, eMBB still aims at users' access to multimedia content, services and data, and its demand is growing rapidly. On the other hand, since eMBB may be deployed in different scenarios, such as indoor, urban, rural, etc., its capabilities and requirements are also quite different, so it cannot be generalized and must be analyzed in detail in combination with specific deployment scenarios. Typical applications of URLLC include: industrial automation, power automation, telemedicine operations (surgery), traffic safety assurance, etc. Typical features of mMTC include: high connection density, small data volume, latency-insensitive services, low cost and long service life of the module.

5G defines a new Radio Resource Control (RRC) state, i.e., RRC_INACTIVE, for the purpose of reducing air interface signaling, quickly restoring wireless connections, and quickly restoring data services. This state is different from the RRC idle (RRC_IDLE) state and the RRC active (RRC_ACTIVE) state.

1) RRC_IDLE state (referred to as idle state): mobility is cell selection and reselection based on terminal device, paging is initiated by the core network (CN), and the paging area is configured by the CN. There is no terminal device context and no RRC connection on the base station side.

2) RRC_CONNECTED state (referred to as connected state): there is an RRC connection, and a terminal device context exists on the base station side and the terminal device side. The network side knows that the location of the terminal device is at the specific cell level. Mobility is the mobility controlled by the network side. Unicast data can be transmitted between the terminal device and the base station.

3) RRC_INACTIVE state (referred to as inactive state): mobility is cell selection and reselection based on terminal device, a connection between CN-NR exists, terminal device context exists on a certain base station, paging is triggered by RAN, the RAN-based paging area is managed by the RAN, and the network side knows the location of the terminal device is based on the RAN-based paging area level.

NR-light type terminal device was introduced in NR R17. The NR-light type terminal device mainly has the following three scenarios:

Industrial Wireless Sensors: Compared with URLLC-type terminal device, industrial wireless sensors have relatively low latency and reliability requirements. At the same time, the cost and power consumption of industrial wireless sensors are also lower than URLLC-type terminal device and eMBB-type terminal device.

Video surveillance: It is mainly used in video surveillance scenarios such as smart cities and industrial factories. The collection and processing of data in smart cities facilitates more effective monitoring and control of urban resources and provides more effective services to urban residents.

Wearables: including smart watches, electronic health devices, and some medical monitoring devices. One commonality of these devices is their small size.

The common requirements of the above three scenarios are: 1) NR-light type terminal device requires lower equipment cost and complexity than R15/16 eMBB type terminal device. The basic consensus is to reduce bandwidth and receive antennas. 2) The size of NR-light type terminal device is relatively small. 3) NR-light type terminal equipment requires coverage equivalent to that of R15/16 eMBB type terminal equipment. If the coverage loss caused by reducing the receiving antenna, reducing the bandwidth, reducing the power level or other reducing the complexity of the terminal equipment, it needs to be compensated.

For the above three scenarios, each scenario also has the following individual requirements: 1) The reliability requirement of industrial wireless sensors is 99.99%, and the end-to-end delay requirement is 100 ms. Bit rate requirement is 2 Mbps. The device is stationary. Battery life is several years. For safety-related sensors, the latency requirement is 5-10 ms. 2) The bit rate requirement for video surveillance is 2-4 Mbps, the delay requirement is less than 500 ms, and the reliability requirement is 99-99.9%. For some high-end video rate requirements are 2-4 Mbps. Upstream traffic is relatively large. 3) Wearable devices can refer to LTE Cat 4, and the rate requirement is 150 Mbps/50 Mbps.

It should be noted that the NR-light type terminal devices mentioned in this application generally refer to those low-capability terminal devices or terminal devices with special applications.

Due to the introduction of NR-light type terminal device, it is necessary to consider the compatibility of NR cells for NR-light type terminal device without affecting the access of traditional terminal device (such as eMBB type terminal device) to NR cells. Thus, it is necessary to consider how to take into account the needs of both traditional terminal device and NR-light type terminal device to access the NR cell. Considering the low bandwidth requirements of NR-light type terminal devices, it is necessary to design different types of cell bandwidths, especially different designs of transmission bandwidths for public resources and public information transmission. Furthermore, the NR-light type terminal device supports relatively low capabilities, such as the supported transport block size (TB size) or modulation and coding scheme (MCS) is relatively low, the supported number of transmission (RX) is low, etc. The capability reporting of the terminal device requires the terminal device to enter the connected state and the AS security to be activated before reporting. Therefore, a solution is required for compatibility of traditional NR terminal device and NR-light type terminal device, or normal camping of different types of NR-light terminal devices on the NR cell, receiving of public messages, and initial access of the cell. To this end, the following technical solutions of the embodiments of the present application are proposed.

FIG. 2 is a schematic flowchart of a BWP configuration method provided by an embodiment of the present application. As shown in FIG. 2, the BWP configuration method includes the following steps.

Step 201: The terminal device receives first configuration information sent by the network device, wherein the first configuration information includes plurality pieces of initial BWP configuration information, and each initial BWP configuration information in the plurality pieces of initial BWP configuration information is associated with a terminal type and/or a terminal capability.

In this embodiment of the present application, the network device sends the first configuration information to the terminal device, and correspondingly, the terminal device receives the first configuration information sent by the network device. In an optional manner, the network device is a base station, such as a gNB.

In an optional mode of the present application, the network device sends first indication information to the terminal device, and accordingly, the terminal device receives the first indication information sent by the network device. The first indication information is used to indicate whether the current cell supports a specific type of terminal device. In an optional manner, the first indication information is carried in a Physical Broadcast Channel (PBCH) or a Master Information Block (MIB) or a System Information Block (SIB). Here, the SIB is SIB1, for example.

In the above solution, the specific type is, for example, an NR-light type. Further, NR-light types can be further classified into multiple NR-light types, and the specific type of terminal device may refer to one or some of the NR-light types.

In an example, the network device sends first indication information to the terminal device, wherein the first indication information is used to indicate whether the current cell supports the terminal device of the NR-light type.

In this embodiment of the present application, the first configuration information includes a plurality pieces of initial BWP configuration information, and each initial BWP configuration information in the plurality pieces of initial BWP configuration information is associated with a terminal type and/or a terminal capability. In an optional manner, the first configuration information is carried in the second SIB. Further, optionally, the second SIB is SIB1.

It should be noted that the terminal device needs to support the bandwidth of the initial BWP of the cell before it can camp on the cell, otherwise the cell is considered to be barred. The configuration information of the initial BWP is configured in SIB1, as shown in Table 1 below:

TABLE 1

| | | |
|---|---|---|
| ServingCellConfigCommonSIB ::= | | SEQUENCE { |
| downlinkConfigCommon | | DownlinkConfigCommonSIB, |
| uplinkConfigCommon | | UplinkConfigCommonSIB |
| OPTIONAL, | -- Need R | |
| supplementaryUplink | | UplinkConfigCommonSIB |
| OPTIONAL, | -- Need R | |
| n-TimingAdvanceOffset | | ENUMERATED { n0, n25600, n39936 } |
| OPTIONAL, | -- Need S | |
| ssb-PositionsInBurst | | SEQUENCE { |
| inOneGroup | | BIT STRING (SIZE (8)), |
| groupPresence | | BIT STRING (SIZE (8)) |
| OPTIONAL | -- Cond FR2-Only | |
| }, | | |
| ssb-PeriodicityServingCell | | ENUMERATED {ms5, ms10, ms20, ms40, ms80, ms160}, |
| tdd-UL-DL-ConfigurationCommon | | TDD-UL-DL-ConfigCommon |
| OPTIONAL, | -- Cond TDD | |
| ss-PBCH-BlockPower | | INTEGER (−60..50), |
| ..., | | |
| [[ | | |
| channelAccessMode-r16 | | CHOICE { |
| dynamic | | NULL, |
| semistatic | | SemiStaticChannelAccessConfig |
| } | | |
| OPTIONAL, | -- Need M | |
| discoveryBurstWindowLength-r16 | | ENUMERATED {s0dot5, s1, s2, s3, s4, s5} |
| OPTIONAL -- Need M | | |
| ]] | | |
| } | | |
| DownlinkConfigCommonSIB ::= | | SEQUENCE { |
| frequencyInfoDL | | FrequencyInfoDL-SIB, |
| initialDownlinkBWP | | BWP-DownlinkCommon, |
| bcch-Config | | BCCH-Config, |
| pcch-Config | | PCCH-Config, |
| ... | | |
| } | | |
| BWP-DownlinkCommon ::= | | SEQUENCE { |
| genericParameters | | BWP, |
| pdcch-ConfigCommon | | SetupRelease { PDCCH-ConfigCommon } |
| OPTIONAL, | -- Need M | |
| pdsch-ConfigCommon | | SetupRelease { PDSCH-ConfigCommon } |
| OPTIONAL, | -- Need M | |
| ... | | |
| } | | |
| PDCCH-ConfigCommon ::= | | SEQUENCE { |
| controlResourceSetZero | | ControlResourceSetZero |
| OPTIONAL, | -- Cond InitialBWP-Only | |
| commonControlResourceSet | | ControlResourceSet |
| OPTIONAL, | -- Need R | |
| searchSpaceZero | | SearchSpaceZero |

TABLE 1-continued

```
OPTIONAL,                          -- Cond InitialBWP-Only
   commonSearchSpaceList                                   SEQUENCE (SIZE(1..4)) OF SearchSpace
OPTIONAL,                          -- Need R
   searchSpaceSIB1                                         SearchSpaceId
OPTIONAL,                          -- Need S
   searchSpaceOtherSystemInformation                       SearchSpaceId
OPTIONAL,                          -- Need S
   pagingSearchSpace                                       SearchSpaceId
OPTIONAL,                          -- Need S
   ra-SearchSpace                                          SearchSpaceId
OPTIONAL,                          -- Need S
   ...,
   [[
firstPDCCH-MonitoringOccasionOfPO                          CHOICE {
   sCS15KHZoneT                                                              SEQUENCE
(SIZE (1..maxPO-perPF)) OF INTEGER (0..139),
   sCS30KHZoneT-SCS15KHZhalfT                                                SEQUENCE
(SIZE (1..maxPO-perPF)) OF INTEGER (0..279),
   sCS60KHZoneT-SCS30KHZhalfT-SCS15KHZquarterT                               SEQUENCE
(SIZE (1..maxPO-perPF)) OF INTEGER (0..559),
   sCS120KHZoneT-SCS60KHZhalfT-SCS30KHZquarterT-SCS15KHZoneEighthT           SEQUENCE
(SIZE (1..maxPO-perPF)) OF INTEGER (0..1119),
   sCS120KHZhalfT-SCS60KHZquarterT-SCS30KHZoneEighthT-SCS15KHZoneSixteenthT  SEQUENCE
(SIZE (1..maxPO-perPF)) OF INTEGER (0..2239),
   sCS120KHZquarterT-SCS60KHZoneEighthT-SCS30KHZoneSixteenthT                SEQUENCE
(SIZE (1..maxPO-perPF)) OF INTEGER (0..4479),
   sCS120KHZoneEighthT-SCS60KHZoneSixteenthT                                 SEQUENCE
(SIZE (1..maxPO-perPF)) OF INTEGER (0..8959),
   sCS120KHZoneSixteenthT                                                    SEQUENCE
(SIZE (1..maxPO-perPF)) OF INTEGER (0..17919)
   }
OPTIONAL                           -- Cond OtherBWP
   ]]
}
BWP ::=                                                    SEQUENCE {
   locationAndBandwidth                                       INTEGER (0..37949),
   subcarrierSpacing                                          SubcarrierSpacing,
   cyclicPrefix                                               ENUMERATED { extended }
OPTIONAL                           -- Need R
}
UplinkConfigCommonSIB ::=                                  SEQUENCE {
   frequencyInfoUL                                            FrequencyInfoUL-SIB,
   initialUplinkBWP                                           BWP-UplinkCommon,
   timeAlignmentTimerCommon                                   TimeAlignmentTimer
}
BWP-UplinkCommon ::=                                       SEQUENCE {
   genericParameters                                          BWP,
   rach-ConfigCommon                                          SetupRelease { RACH-ConfigCommon }
OPTIONAL,                          -- Need M
   pusch-ConfigCommon                                         SetupRelease { PUSCH-ConfigCommon }
OPTIONAL,                          -- Need M
   pucch-ConfigCommon                                         SetupRelease { PUCCH-ConfigCommon }
OPTIONAL,                          -- Need M
   ...,
   [[
   rach-ConfigCommonIAB-r16                                   SetupRelease { RACH-ConfigCommonIAB-r16 }
OPTIONAL,                          -- Need M
   useInterlacePUCCH-PUSCH-r16                                ENUMERATED {enabled}
OPTIONAL,                          -- Need M
   rach-ConfigCommonTwoStepRA-r16                             SetupRelease { RACH-ConfigCommonTwoStepRA-r16 }
OPTIONAL,                          -- Need M
   msgA-PUSCH-Config-r16                                      SetupRelease { MsgA-PUSCH-Config-r16 }
OPTIONAL                           -- Need M
   ]]
}
BWP ::=                                                    SEQUENCE {
   locationAndBandwidth                                       INTEGER (0..37949),
   subcarrierSpacing                                          SubcarrierSpacing,
   cyclicPrefix                                               ENUMERATED { extended }
OPTIONAL                           -- Need R
}
```

The above Table 1 shows the configuration information of one uplink initial BWP and the configuration information of one downlink initial BWP. In this embodiment of the present application, in order to enable terminal devices with various terminal types and/or terminal capabilities to camp on a cell, the cell needs to configure specific initial BWP configuration information for different types of terminal types and/or terminal capabilities.

In this embodiment of the present application, a plurality pieces of initial BWP configuration information are configured in the first configuration information, and each initial BWP configuration information is associated with a terminal type and/or terminal capability. The plurality pieces of initial BWP configuration information include initial BWP configuration information respectively associated with multiple terminal types and/or terminal capabilities.

A) In an optional manner, the multiple terminal types and/or terminal capabilities are determined based on the terminal types and/or terminal capabilities supported in the standard.

For example, a base station (such as a gNB) can broadcast the configuration information of the initial BWP associated with each NR-light type terminal according to the NR-light terminal type supported in the standard, respectively.

B) In another optional manner, the multiple terminal types and/or terminal capabilities are determined based on auxiliary information provided by the core network, wherein the auxiliary information is used to indicate the terminal type and/or the terminal capability of one or more terminals registered with the core network.

For example, a base station (such as a gNB) broadcasts the configuration information of the initial BWP associated with each NR-light type terminal according to the auxiliary information provided by the core network. Here, during the registration process, the terminal device sends the indication information used to indicate it's supported terminal type and/or terminal capability to the AMF through the NAS message, and the AMF sends the received indication information (i.e., the auxiliary information) of all terminal devices to all the base stations logically connected to the AMF.

C) The multiple terminal types and/or terminal capabilities are determined based on supported terminal types and/or terminal capabilities of the base station.

For example, a base station (such as a gNB) broadcasts the configuration information of the initial BWP associated with each NR-light type terminal according to its own capabilities (such as the terminal types and/or terminal capabilities it supports).

In this embodiment of the present application, the plurality pieces of initial BWP configuration information include configuration information of multiple uplink initial BWPs and configuration information of multiple downlink initial BWPs. Each initial BWP in the plurality of uplink initial BWPs and the plurality of downlink initial BWPs is associated with one terminal type and/or terminal capability.

In this embodiment of the present application, multiple uplink initial BWPs form an uplink initial BWP list, and multiple downlink initial BWPs form a downlink initial BWP list. The uplink initial BWPs in the uplink initial BWP list and the downlink initial BWPs in the downlink initial BWP list may be associated together as follows:

Manner 1: each initial BWP of the plurality of uplink initial BWPs and the plurality of downlink initial BWPs are associated with one identification information, and different identification information is associated with different terminal types and/or terminal capabilities; wherein, the uplink initial BWP and the downlink initial BWP associated with the same identification information are associated together.

Manner 2: each initial BWP in the plurality of uplink initial BWPs and the plurality of downlink initial BWPs has a BWP index; wherein, the uplink initial BWP and the downlink initial BWP having the same BWP index are associated together.

In the above manner, the associated uplink initial BWP and downlink initial BWP are used for uplink transmission and downlink reception, respectively. For example, in the random access process, the associated uplink initial BWP and downlink initial BWP may be used for sending MSG1 and receiving MSG2, respectively.

The configuration information of the uplink initial BWP and the configuration information of the downlink initial BWP in the above solution will be described below.

Configuration Information of the Uplink Initial BWP

In an optional manner, the configuration information of the initial uplink BWP includes at least one of the following: bandwidth of the initial uplink BWP, subcarrier spacing of the initial uplink BWP, cyclic prefix of the initial uplink BWP, frequency information of the initial uplink BWP, RACH common configuration information, PUCCH common configuration information, and PUSCH common configuration information.

In another optional manner, the configuration information of the initial uplink BWP includes at least one of the following: bandwidth of the initial uplink BWP, subcarrier spacing of the initial uplink BWP, cyclic prefix of the initial uplink BWP, and frequency information of the initial uplink BWP; wherein, the configuration information of the multiple uplink initial BWPs share at least one of the following information: RACH common configuration information, PUCCH common configuration information, and PUSCH common configuration information.

In yet another optional manner, the configuration information of the initial uplink BWP includes at least one of the following: bandwidth of the initial uplink BWP, and frequency information of the initial uplink BWP; wherein the configuration information of the multiple initial uplink BWPs share at least one of the following information: subcarrier spacing of the uplink initial BWP, cyclic prefix of the uplink initial BWP, RACH common configuration information, PUCCH common configuration information, and PUSCH common configuration information.

Configuration Information of Downlink Initial BWP

In an optional manner, the configuration information of the downlink initial BWP includes at least one of the following: the bandwidth of the downlink initial BWP, the subcarrier spacing of the downlink initial BWP, the cyclic prefix of the downlink initial BWP, the frequency point information of the downlink initial BWP, BCCH configuration information, PCCH configuration information, PDCCH common configuration information, and PDSCH common configuration information.

In another optional manner, the configuration information of the initial downlink BWP includes at least one of the following: bandwidth of the initial downlink BWP, subcarrier spacing of the initial downlink BWP, cyclic prefix of the initial downlink BWP, frequency information of the initial downlink BWP, BCCH configuration information, and PCCH configuration information; wherein, the configuration information of the multiple downlink initial BWPs share at least one of the following information: PDCCH common configuration information, and PDSCH common configuration information.

In yet another optional manner, the configuration information of the initial downlink BWP includes at least one of the following: bandwidth of the initial downlink BWP, and frequency information of the initial downlink BWP; wherein, the configuration information of the multiple initial downlink BWPs share at least one of the following information: subcarrier spacing of downlink initial BWP, cyclic prefix of downlink initial BWP, BCCH configuration information, PCCH configuration information, PDCCH common configuration information, and PDSCH common configuration information.

Step 202: The terminal device selects first initial BWP configuration information from the plurality pieces of initial BWP configuration information based on the first configuration information, and resides on the first initial BWP based on the first initial BWP.

In this embodiment of the present application, the terminal device may select the first initial BWP configuration information from the plurality pieces of initial BWP configuration information in the following manner.

Manner I) The terminal device selects the first initial BWP configuration information from the plurality pieces of initial BWP configuration information according to the first terminal type and/or the first terminal capability that it supports, and the first initial BWP configuration information is associated with the first terminal type and/or the first terminal capability.

Here, the terminal device may select an appropriate initial BWP according to the terminal type and/or terminal capability that it supports, and the terminal type and/or terminal capability associated with the configured multiple initial BWPs.

Manner II) The terminal device selects the first initial BWP configuration information from the plurality pieces of initial BWP configuration information according to the first BWP index that is supports, wherein the first initial BWP has the first BWP index; wherein, the first BWP index is associated with a first terminal type and/or a first terminal capability supported by the terminal device, and the first initial BWP configuration information is associated with the first terminal type and/or first terminal capability.

Here, the terminal device may select an appropriate initial BWP according to the BWP index that it supports and the terminal type and/or terminal capability associated with the configured multiple initial BWPs.

In this embodiment of the present application, after selecting the first initial BWP configuration information, the terminal device may perform at least one of the following operations.

Operation 1

The terminal device receives a paging PDCCH on the first initial BWP, and the paging PDCCH is used to schedule a paging message; wherein the paging PDCCH is descrambled using a P-RNTI; or, the paging PDCCH is descrambled using a dedicated RNTI.

Operation 2

The terminal device receives the first SI PDCCH on the first initial BWP, and the first SI PDCCH is used to schedule the first SIB; wherein, the first SI PDCCH is descrambled by using the SI-RNTI; or, the first SI PDCCH is descrambled using a dedicated RNTI.

Operation 3

The terminal device initiates a random access procedure to the network device on the first initial BWP, wherein the first initial BWP is used by the network device to determine the first terminal type and/or the first terminal capability supported by the terminal device.

For example, after receiving the SIB1, the terminal device obtains the first configuration information from the SIB1, and selects an appropriate initial BWP (i.e., the first initial BWP) to reside on. The terminal device receives the paging message, and/or SIB, and/or initiates a random access procedure on the first initial BWP. If the terminal device does not support the bandwidth of the selected initial BWP (that is, the bandwidth indicated by locationAndBandwidth), the terminal device considers the cell to be barred.

In the above embodiment, for the paging triggered by the terminal device of the NR-light type, the AMF pushes the type information of the terminal device to the base station, and the base station determines the initial BWP where the terminal device receives the paging message according to the type of the terminal device being paged, thereby sending a paging message on the initial BWP.

In the above embodiment, when the terminal device receives the paging PDCCH of the NR-light type terminal device, it can use the P-RNTI to descramble the paging PDCCH, or use the RNTI dedicated to NR-light to descramble the paging PDCCH, wherein the RNTI dedicated to NR-light specified by the protocol. When the terminal device receives the SI PDCCH of the NR-light type terminal device, it can use the SI-RNTI to descramble the SI PDCCH, or use the RNTI dedicated to NR-light to descramble the SI PDCCH, wherein the RNTI dedicated to NR-light is specified by the protocol.

In the above embodiment, after the terminal device selects the initial BWP (that is, the first initial BWP), the random access process is initiated on the first initial BWP, and the network side determines, according to the first initial BWP where the terminal device initiates the random access process, that the terminal device is a NR-light type terminal device and/or the capability supported by the terminal device.

In an optional manner of the present application, the network device sends the second indication information and the third indication information to the terminal device, and accordingly, the terminal device receives the second indication information and the third indication information sent by the network device; wherein the second indication information is used to indicate whether the current cell allows access to a specific type of terminal device, and the third indication information is used to determine resource configuration information of the RMSI PDCCH.

In the above embodiment, the third indication information includes first index information and second index information, the first index information is used to determine the configuration information of the first CORESET, and the second index information is used to determine the configuration information of the first search space.

In the above solution, the resource configuration information of the RMSI PDCCH is used to determine the candidate time-frequency position of the RMSI PDCCH, and the candidate time-frequency position of the RMSI PDCCH can be determined based on the configuration information of the CORESET and the configuration information of the search space, that is to say, the "resource configuration information of the RMSI PDCCH" can be understood as "the resource configuration information of the RMSI PDCCH and the configuration information of the search space".

In this embodiment of the present application, the terminal device may determine the configuration information of the first CORESET and the configuration information of the first search space in the following manner.

Manner 1: if the second indication information indicates that the current cell allows access to a specific type of terminal device: the terminal device determines the configuration information of the first CORESET in a first table based on the first index information, and determines the configuration information of the first search space in a second table based on the second index information; wherein the first table and the second table are tables defined for the specific type of terminal device.

Manner 2: if the second indication information indicates that the current cell allows access to a specific type of terminal device: the terminal device transforms the first index information to obtain third index information; and transforms the second index information to obtain fourth index information; the terminal device determines the configuration information of the first CORE-SET in a third table based on the third index information, and determines the configuration information of the first search space in a fourth table based on the fourth index information; wherein the third table and the fourth table are tables defined for a common type of terminal device.

After the configuration information of the first CORESET and the configuration information of the first search space are determined in the above manner (that is, the terminal device determines the resource configuration information of the RMSI PDCCH), the terminal device receives the second SI PDCCH, wherein the second SI PDCCH is used for scheduling the second SIB; the terminal device receives the second SIB based on the second SI PDCCH, and obtains the first configuration information from the second SIB. Further, optionally, the second SI PDCCH is descrambled by using an SI-RNTI; or, the second SI PDCCH is descrambled by using a dedicated RNTI.

In the above solution, optionally, the second indication information and the third indication information are carried in the MIB. The following Table 2 gives the contents of the MIB:

TABLE 2

| MIB ::= | SEQUENCE { |
|---|---|
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

Referring to Table 2, the second indication information can be implemented by a spare bit in the MIB. If the spare bit is set to 1 (or 0), it means that the current cell allows access to NR-light type terminal device, if the spare bit is set to 0 (or 1), it means that the current cell does not allow access to NR-light type terminal device. The third indication information may be implemented by pdcch-ConfigSIB1 in the MIB, and pdcch-ConfigSIB1 occupies 8 bits.

For the common type of terminal device, the common type of terminal device (such as eMBB type terminal device) interprets the 8 bits corresponding to pdcch-ConfigSIB1: 4 bits in the 8 bits represent the index information of CORE- SET, which is used in a table (called the third table, see Table 3 below) to determine the configuration information of CORESET, and the other 4 bits of the 8 bits represent the index information of the search space, which is used to determine the search space configuration information in another table (called the fourth table).

TABLE 3

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | | Reserved | | |

It should be noted that the CORESET in the above solution may also be referred to as "CORESET#0".

Corresponding to the above manner 1, for a terminal device of a specific type (such as an NR-light type or a certain NR-light type), the interpretation of the 8 bits corresponding to pdcch-ConfigSIB1 is different from that of a common terminal device. For example: if the spare bit in the MIB is set to 1 (indicating that the current cell allows access to NR-light type terminal device), the NR-light type terminal device interprets the 8 bits corresponding to pdcch-ConfigSIB1 with reference to the table defined by the protocol. Specifically, 4 bits of the 8 bits represent the index information of the CORESET, which is used to determine the configuration information of the CORESET in the newly defined first table, and the other 4 bits of the 8 bits represent the index information of the search space, which is used to determine the configuration information of the search space in another newly defined second table. It should be noted that the first table is a newly defined table associated with CORESET index information for NR-light type terminal device, and the second table is a newly defined table associated with search space index information for NR-light type terminal device. Each index in the first table corresponds to a CORESET configuration, and each index in the second table corresponds to a search space configuration. If the spare bit in the MIB is set to 0 (indicating that the current cell does not allow access to NR-light type terminal device), the NR-light type terminal device does not interpret the 8 bits corresponding to pdcch-ConfigSIB1.

Corresponding to the above method 2, for a terminal device of a specific type (such as an NR-light type or a certain NR-light type), if the spare bit in the MIB is set to 1 (indicating that the current cell allows access to the NR-light type of terminal device), the NR-light type terminal device interprets the 8 bits corresponding to pdcch-ConfigSIB1 that 4 bits in the 8 bits represent the index information of CORESET, wherein the index information of the CORESET represented by the 4 bits can be transformed according to the offset or scaling factor defined by the standard or the rules defined by the standard, and the configuration information of the CORESET is determined in a table (referred to as the third table) according to the transformed index information; the other 4 bits in the 8 bits represent the index information of the search space, wherein the index information of the search space represented by the 4 bits can be transformed according to the offset or scaling factor defined by the standard or the rules defined by the standard, and the configuration information of the search space is determined in another table (referred to as the fourth table) according to the transformed index information. For example: the index information represented by 4 bit is index=a, then the index used by the terminal device of the NR-light type is a-k; further, if a-k is less than 0, the index used by the terminal device of the NR-light type is the absolute value of k or 0. For another example: the index information represented by 4 bits is index=a, then the index used by the NR-light type terminal device is a*k rounded up or a*k rounded down, and k is a scaling coefficient.

Referring to FIG. 3, the CSS of the NR-light type terminal device is the most basic CSS. The terminal device acquires the second SIB (e.g., SIB1) on the BWP (referred to as the lowest BWP) corresponding to the CSS, and then acquires the configuration information of the initial BWP configured for the terminal device of the NR-light type in SIB1. Then, the terminal device can find out a suitable initial BWP according to the terminal type and/or terminal capability it supports.

In the technical solutions of the embodiments of the present application, the configuration information of multiple initial BWPs is defined by the second SIB, so that different types of terminal devices reside in appropriate initial BWPs, so as to expand the cell capacity and be compatible with specific types (such as NR-light type) for the purpose of the terminal device. In addition, by defining the most basic CSS, the terminal device obtains the second SIB on the CSS, and obtains the configuration information of multiple initial BWPs from the second SIB, so that different types of terminal devices reside in the appropriate initial BWP, thereby achieving the purpose of expanding the cell capacity and being compatible with NR-light type terminal device.

Figure 4:
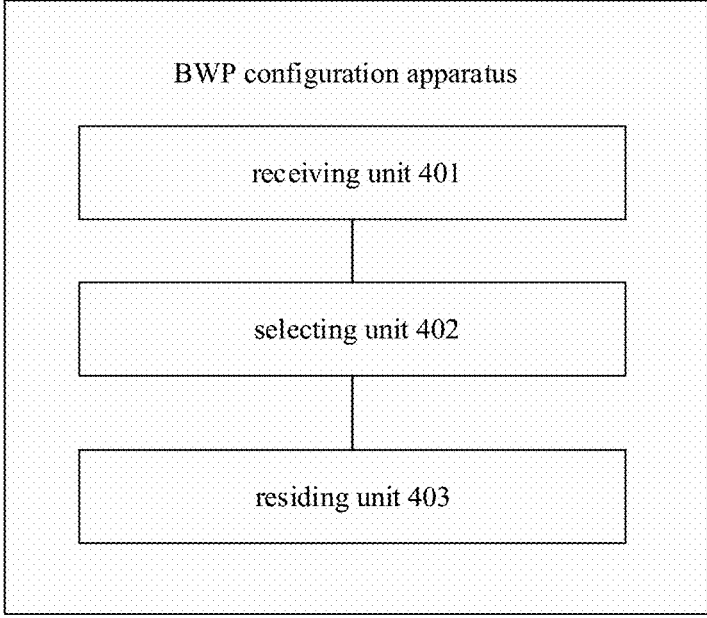
FIG. 4 is a structural schematic diagram 1 of the BWP configuration device provided by the embodiment of the present application.

FIG. 4 is a schematic structural diagram 1 of a BWP configuration apparatus provided by an embodiment of the present application, which is applied to a terminal device. As shown in FIG. 4, the BWP configuration apparatus includes:
  a receiving unit 401, configured to receive first configuration information sent by a network device, wherein the first configuration information includes a plurality pieces of initial BWP configuration information, and each piece of initial BWP configuration information in the plurality pieces of initial BWP configuration information is associated with a terminal type and/or a terminal capability; and
  a selecting unit 402, configured to select first initial BWP configuration information from the plurality pieces of initial BWP configuration information based on the first configuration information; and
  a residing unit 403, configured to reside on a first initial BWP based on the first initial BWP configuration information.

In an optional manner, the plurality pieces of initial BWP configuration information include configuration information of a plurality of uplink initial BWPs and configuration information of a plurality of downlink initial BWPs.

In an optional manner, each initial BWP of the plurality of uplink initial BWPs and the plurality of downlink initial BWPs is associated with one piece of identification information, and different identification information is associated with different terminal types and/or or terminal capabilities; and
  wherein, the uplink initial BWP and the downlink initial BWP associated with same identification information are associated together.

In an optional manner, each initial BWP of the plurality of uplink initial BWPs and the plurality of downlink initial BWPs includes a BWP index; and
  wherein, the uplink initial BWP and the downlink initial BWP with a same BWP index are associated together.

In an optional manner, associated uplink initial BWP and downlink initial BWP are used for uplink transmission and downlink reception, respectively.

In an optional manner, the configuration information of the uplink initial BWP includes at least one of:
  bandwidth of the uplink initial BWP, subcarrier spacing of the uplink initial BWP, cyclic prefix of the uplink initial BWP, frequency point information of the uplink initial BWP, RACH common configuration information, PUCCH common configuration information, and PUSCH common configuration information; or,
  bandwidth of the uplink initial BWP, subcarrier spacing of the uplink initial BWP, cyclic prefix of the uplink initial BWP, and frequency point information of the uplink initial BWP; wherein, the configuration information of the plurality of uplink initial BWPs share at least one of following information: RACH common configuration information, PUCCH common configuration information, and PUSCH common configuration information; or,
  bandwidth of the uplink initial BWP, and frequency information of the uplink initial BWP; wherein, the configuration information of the plurality of uplink initial BWPs share at least one of following information: subcarrier spacing of the uplink initial BWP, cyclic prefix of the uplink initial BWP, RACH common configuration information, PUCCH common configuration information, and PUSCH common configuration information.

In an optional manner, configuration information of the downlink initial BWP includes at least one of:
  bandwidth of the downlink initial BWP, subcarrier spacing of the downlink initial BWP, cyclic prefix of the downlink initial BWP, frequency point information of the downlink initial BWP, BCCH configuration information, PCCH configuration information, PDCCH common configuration information, and PDSCH common configuration information; or,
  bandwidth of the downlink initial BWP, subcarrier spacing of the downlink initial BWP, cyclic prefix of the downlink initial BWP, frequency point information of the downlink initial BWP, BCCH configuration information, and PCCH configuration information; wherein, the configuration information of the plurality of downlink initial BWPs share at least one of following information: PDCCH common configuration information, and PDSCH common configuration information; or,
  bandwidth of the downlink initial BWP and frequency information of the downlink initial BWP; wherein, the configuration information of the plurality of downlink initial BWPs share at least one of following information: subcarrier spacing of the downlink initial BWP, cyclic prefix of the downlink initial BWP, BCCH configuration information, PCCH configuration information, PDCCH common configuration information, and PDSCH common configuration information.

In an optional manner, the plurality pieces of initial BWP configuration information include initial BWP configuration information respectively associated with a plurality of terminal types and/or terminal capabilities; wherein, the plurality of terminal types and/or terminal capabilities are determined based on terminal types and/or terminal capabilities supported in a standard; or, the plurality of terminal types and/or terminal capabilities are determined based on auxiliary information provided by a core network, wherein the auxiliary information is used to indicate terminal types and/or terminal capabilities of one or more terminals registered with the core network; or, the plurality of terminal types and/or terminal capabilities are determined based on terminal types and/or terminal capabilities supported by a base station.

In an optional manner, the selecting unit 402 is configured to select the first initial BWP configuration information from the plurality pieces of initial BWP configuration information according to a first terminal type and/or a first terminal capability supported by the terminal device, and the first initial BWP configuration information is associated with the first terminal type and/or the first terminal capability.

In an optional manner, the selecting unit 402 is configured to select the first initial BWP configuration information from the plurality pieces of initial BWP configuration information according to a first BWP index supported by the terminal, wherein the first initial BWP includes the first BWP index; wherein the first BWP index is associated with a first terminal type and/or a first terminal capability supported by the terminal device, and the first initial BWP configuration information is associated with the first terminal type and/or a first terminal capability.

In an optional manner, the receiving unit 401 is further configured to receive a paging PDCCH on the first initial BWP, wherein the paging PDCCH is used to schedule a paging message;

wherein, the paging PDCCH is descrambled using a P-RNTI; or, the paging PDCCH is descrambled using a dedicated RNTI.

In an optional manner, the receiving unit 401 is further configured to receive a first SI PDCCH on the first initial BWP, wherein the first SI PDCCH is used to schedule a first SIB;

wherein, the first SI PDCCH is descrambled by using a SI-RNTI; or, the first SI PDCCH is descrambled by using a dedicated RNTI.

In an optional manner, the apparatus further includes:
a sending unit (not shown in the drawings), configured to initiate a random access procedure to the network device on the first initial BWP, wherein the first initial BWP is used by the network device to determine a first terminal type and/or a first terminal capability supported by the terminal device.

In an optional manner, the first configuration information is carried in a second SIB.

In an optional manner, the receiving unit 401 is further configured to receive first indication information sent by the network device, wherein the first indication information is used to indicate whether a current cell supports a specific type of terminal device.

In an optional manner, the first indication information is carried in a PBCH or an MIB or an SIB.

In an optional manner, the receiving unit 401 is further configured to receive second indication information and third indication information sent by the network device; wherein the second indication information is used to indicate whether a current cell allows access to a specific type of terminal device, and the third indication information is used to determine resource configuration information of a RMSI PDCCH.

In an optional manner, the third indication information includes first index information and second index information, the first index information is used to determine configuration information of a first CORESET, and the second index information is used to determine configuration information of a first search space.

In an optional manner, the apparatus further includes:
a determining unit (not shown in the drawings), configured to determine the configuration information of the first CORESET in a first table based on the first index information, and determine the configuration information of the first search space in a second table based on the second index information;

wherein, the first table and the second table are tables defined for the specific type of terminal device.

In an optional manner, the apparatus further includes:
a determining unit (not shown in the drawings), configured to transform, if the second indication information indicates that the current cell allows access to the specific type of terminal device, the first index information to obtain third index information, transform the second index information to obtain fourth index information, determine the configuration information of the first CORESET in a third table based on the third index information, and determine the configuration information of the first search space in a fourth table based on the fourth index information, wherein, the third table and the fourth table are tables defined for a common type of terminal device.

In an optional manner, the receiving unit 401 is further configured to receive, based on resource configuration information of a RMSI PDCCH, a second SI PDCCH, wherein the second SI PDCCH is used to schedule a second SIB; and receive the second SIB based on the second SI PDCCH, and obtain the first configuration information from the second SIB.

In an optional manner, the second SI PDCCH is descrambled using an SI-RNTI; or, the second SI PDCCH is descrambled using a dedicated RNTI.

In an optional manner, the second indication information and the third indication information are carried in an MIB.

Those skilled in the art should understand that the relevant description of the above-mentioned BWP configuration apparatus in the embodiment of the present application can be understood with reference to the relevant description of the BWP configuration method in the embodiment of the present application.

Figure 5:
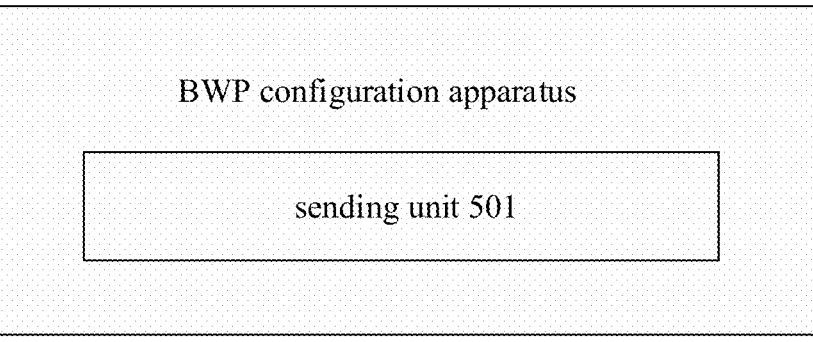
FIG. 5 is a structural schematic diagram 2 of the BWP configuration device provided by the embodiment of the present application.

FIG. 5 is a schematic structural diagram 2 of a BWP configuration apparatus provided by an embodiment of the present application, which is applied to a network device. As shown in FIG. 5, the BWP configuration apparatus includes:

a sending unit 501, configured to send first configuration information to a terminal device, wherein the first configuration information includes a plurality pieces of initial BWP configuration information, and each piece of initial BWP configuration information in the plurality pieces of initial BWP configuration information is associated with a terminal type and/or terminal capability;

wherein, the first configuration information is used for the terminal device to select first initial BWP configuration information from the plurality pieces of initial BWP configuration information, and to reside on the first initial BWP based on the first initial BWP configuration information.

In an optional manner, the plurality pieces of initial BWP configuration information include configuration information of a plurality of uplink initial BWPs and configuration information of a plurality of downlink initial BWPs.

In an optional manner, each initial BWP in the plurality of uplink initial BWPs and the plurality of downlink initial BWPs is associated with one piece of identification information, and different identification information is associated with different terminal types and/or or terminal capabilities; wherein, the uplink initial BWP and the downlink initial BWP associated with same identification information are associated together.

In an optional manner, each initial BWP of the plurality of uplink initial BWPs and the plurality of downlink initial BWPs includes a BWP index; wherein, the uplink initial BWP and the downlink initial BWP with a same BWP index are associated together.

In an optional manner, associated uplink initial BWP and downlink initial BWP are used for uplink transmission and downlink reception, respectively.

In an optional manner, the configuration information of the uplink initial BWP includes at least one of: bandwidth of the uplink initial BWP, subcarrier spacing of the uplink initial BWP, cyclic prefix of the uplink initial BWP, frequency point information of the uplink initial BWP, RACH common configuration information, PUCCH common configuration information, and PUSCH common configuration information; or, bandwidth of the uplink initial BWP, subcarrier spacing of the uplink initial BWP, cyclic prefix of the uplink initial BWP, and frequency point information of the uplink initial BWP; wherein, the configuration information of the plurality of uplink initial BWPs share at least one of following information: RACH common configuration information, PUCCH common configuration information, and PUSCH common configuration information; or, bandwidth of the uplink initial BWP, and frequency information of the uplink initial BWP; wherein, the configuration information of the plurality of uplink initial BWPs share at least one of following information: subcarrier spacing of the uplink initial BWP, cyclic prefix of the uplink initial BWP, RACH common configuration information, PUCCH common configuration information, and PUSCH common configuration information.

In an optional manner, the configuration information of the downlink initial BWP includes at least one of: bandwidth of the downlink initial BWP, subcarrier spacing of the downlink initial BWP, cyclic prefix of the downlink initial BWP, frequency point information of the downlink initial BWP, BCCH configuration information, PCCH configuration information, PDCCH common configuration information, and PDSCH common configuration information; or, bandwidth of the downlink initial BWP, subcarrier spacing of the downlink initial BWP, cyclic prefix of the downlink initial BWP, frequency point information of the downlink initial BWP, BCCH configuration information, and PCCH configuration information; wherein, the configuration information of the plurality of downlink initial BWPs share at least one of following information: PDCCH common configuration information, and PDSCH common configuration information; or, bandwidth of the downlink initial BWP and frequency information of the downlink initial BWP; wherein, the configuration information of the plurality of downlink initial BWPs share at least one of following information: subcarrier spacing of the downlink initial BWP, cyclic prefix of the downlink initial BWP, BCCH configuration information, PCCH configuration information, PDCCH common configuration information, and PDSCH common configuration information.

In an optional manner, the plurality pieces of initial BWP configuration information include initial BWP configuration information respectively associated with a plurality of terminal types and/or terminal capabilities; wherein, the plurality of terminal types and/or terminal capabilities are determined based on terminal types and/or terminal capabilities supported in a standard; or, the plurality of terminal types and/or terminal capabilities are determined based on auxiliary information provided by a core network, wherein the auxiliary information is used to indicate terminal types and/or terminal capabilities of one or more terminals registered with the core network; or, the plurality of terminal types and/or terminal capabilities are determined based on terminal types and/or terminal capabilities supported by a base station.

In an optional manner, the first configuration information is carried in a second SIB.

In an optional manner, the sending unit 501 is further configured to send first indication information to the terminal device, wherein the first indication information is used to indicate whether the current cell supports a specific type of terminal device.

In an optional manner, the first indication information is carried in a PBCH or an MIB or an SIB.

In an optional manner, the sending unit 501 is further configured to send second indication information and third indication information to the terminal device; wherein the second indication information is used to indicate whether a current cell allows access to a specific type of terminal device, and the third indication information is used to determine resource configuration information of a RMSI PDCCH.

In an optional manner, the third indication information includes first index information and second index information, the first index information is used to determine configuration information of a first CORESET, and the second index information is used to determine configuration information of a first search space.

In an optional manner, the second indication information and the third indication information are carried in an MIB.

Those skilled in the art should understand that the relevant description of the above-mentioned BWP configuration apparatus in the embodiment of the present application can be understood with reference to the relevant description of the BWP configuration method in the embodiment of the present application.

Figure 6:
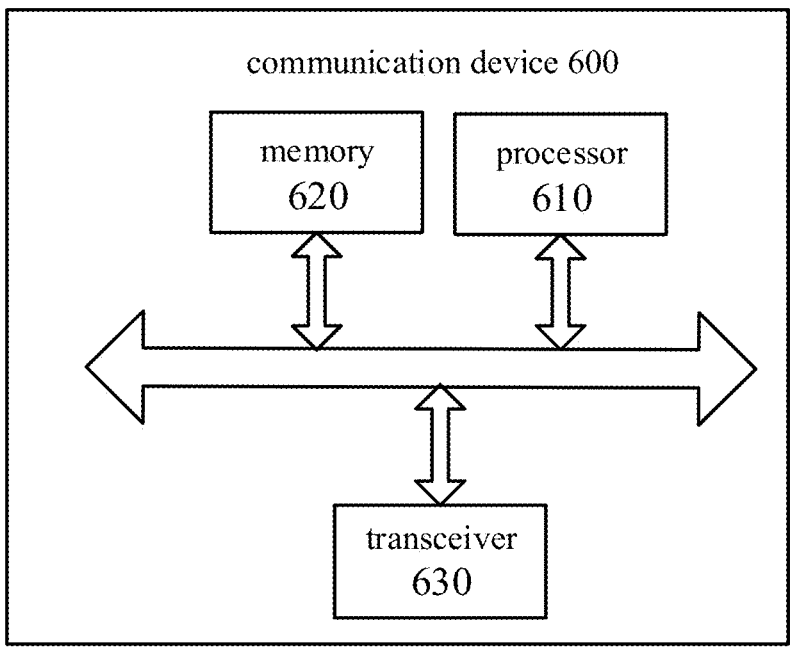
FIG. 6 is a schematic structural diagram of a communication device provided by an embodiment of the present application.

FIG. 6 is a schematic structural diagram of a communication device 600 provided by an embodiment of the present application. The communication device may be a terminal device or a network device. The communication device 600 shown in FIG. 6 includes a processor 610, and the processor 610 may invoke and execute the computer program stored in the memory, to implement the method according to embodiments of the present application.

Optionally, as shown in FIG. 6, the communication device 600 may further include a memory 620. The processor 610 may invoke and execute the computer program from the memory 620 to implement the methods in the embodiments of the present application.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices, specifically, may send information or data to other devices, or receive information or data sent by other devices.

The transceiver 630 may include a transmitter and a receiver. The transceiver 630 may further include antennas, and the number of the antennas may be one or more.

Optionally, the communication device 600 may specifically be the network device in this embodiment of the present application, and the communication device 600 may implement the corresponding processes implemented by the network device in each method in the embodiment of the present application. For the sake of brevity, details are not repeated here.

Optionally, the communication device 600 may specifically be the mobile terminal/terminal device of the embodiments of the present application, and the communication device 600 may implement the corresponding processes implemented by the mobile terminal/terminal device in each method of the embodiments of the present application, for the sake of brevity, details are not repeated here.

Figure 7:
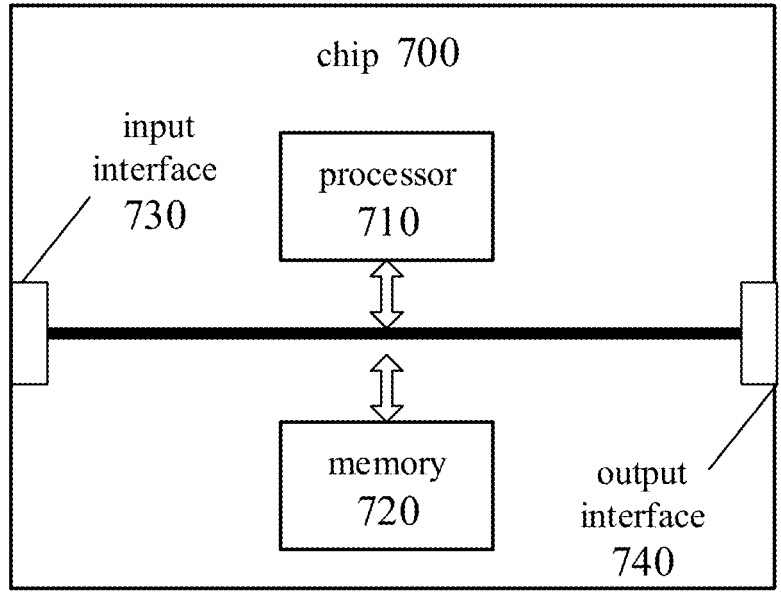
FIG. 7 is a schematic structural diagram of a chip according to an embodiment of the present application.

FIG. 7 is a schematic structural diagram of a chip according to an embodiment of the present application. The chip 700 shown in FIG. 7 includes a processor 710, and the processor 710 can invoke and execute a computer program from a memory to implement the methods in the embodiments of the present application.

Optionally, as shown in FIG. 7, the chip 700 may further include a memory 720. The processor 710 may invoke and execute the computer program from the memory 720 to implement the methods in the embodiments of the present application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 may control the output interface 740 to communicate with other devices or chips, and specifically, may output information or data to other devices or chips.

Optionally, the chip can be applied to the network device in the embodiment of the present application, and the chip can implement the corresponding processes implemented by the network device in each method of the embodiment of the present application, which is not repeated here for brevity.

Optionally, the chip can be applied to the mobile terminal/terminal device in the embodiments of the present application, and the chip can implement the corresponding processes implemented by the mobile terminal/terminal device in each method of the embodiments of the present application, which is not repeated here for brevity.

It should be understood that the chip mentioned in the embodiments of the present application may also be referred to as a system-on-chip, a system-on-chip, a system-on-chip, or a system-on-a-chip, or the like.

Figure 8:
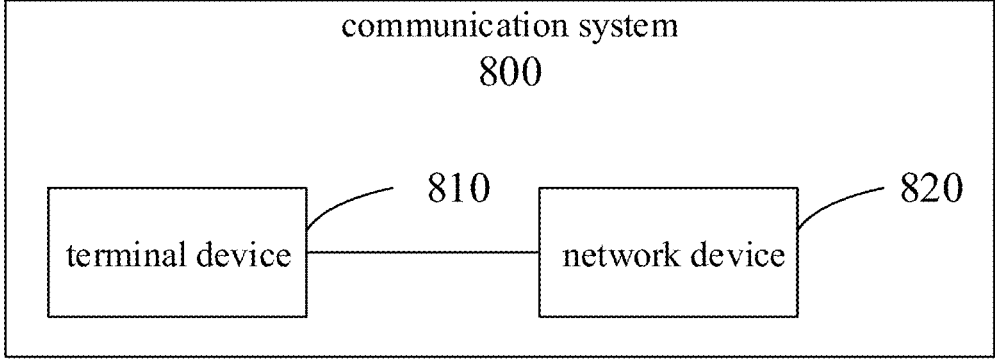
FIG. 8 is a schematic block diagram of a communication system provided by an embodiment of the present application.

FIG. 8 is a schematic block diagram of a communication system 800 provided by an embodiment of the present application. As shown in FIG. 8, the communication system 800 includes a terminal device 810 and a network device 820.

The terminal device 810 can be used to implement the corresponding functions implemented by the terminal device in the above method, and the network device 820 can be used to implement the corresponding functions implemented by the network device in the above method. For brevity, details are not repeated here.

It should be understood that the processor in this embodiment of the present application may be an integrated circuit chip, which has a signal processing capability. In the implementation process, each step of the above method embodiments may be completed by a hardware integrated logic circuit in a processor or an instruction in the form of software. The above-mentioned processor may be a general-purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of this application can be implemented or executed. A general purpose processor may be a microprocessor or the processor may be any conventional processor or the like. The steps of the methods disclosed in conjunction with the embodiments of the present application may be directly embodied as executed by a hardware decoding processor, or executed by a combination of hardware and software modules in the decoding processor. The software module may be located in random access memory, flash memory, read-only memory, programmable read-only memory or electrically erasable programmable memory, registers and other storage media mature in the art. The storage medium is located in the memory, and the processor reads the information in the memory, and completes the steps of the above method in combination with its hardware.

It can be understood that the memory in this embodiment of the present application may be a volatile memory or a non-volatile memory, or may include both volatile and non-volatile memory. The non-volatile memory may be a read-only memory (ROM), a programmable read-only memory (Programmable ROM, PROM), an erasable programmable read-only memory (Erasable PROM, EPROM), an electrically programmable read-only memory (Electrically EPROM, EEPROM) or flash memory. The volatile memory may be a random access memory (RAM), which acts as an external cache. By way of example and not limitation, many forms of RAM are available, such as static RAM (SRAM), dynamic RAM (DRAM), synchronous DRAM, SDRAM), double data rate SDRAM (DDR SDRAM), enhanced SDRAM (ESDRAM), Synchlink DRAM (SLDRAM) and direct rambus RAM (DR RAM). It should be noted that the memory of the systems and methods described herein is intended to include, but not be limited to, these and any other suitable types of memory.

It should be understood that the above-mentioned memory is an example but not a limitative description. For example, the memory in this embodiment of the present application may also be a static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection dynamic random access memory (synch link DRAM, SLDRAM) and direct memory bus random access memory (Direct Rambus RAM, DR RAM) and so on. That is, the memory in the embodiments of the present application is intended to include but not limited to these and any other suitable types of memory.

Embodiments of the present application further provide a computer-readable storage medium for storing a computer program.

Optionally, the computer-readable storage medium can be applied to the network device in the embodiments of the present application, and the computer program enables the computer to execute the corresponding processes implemented by the network device in the various methods of the embodiments of the present application, which are not repeated here for brevity.

Optionally, the computer-readable storage medium can be applied to the mobile terminal/terminal device in the embodiments of the present application, and the computer program enables the computer to execute the corresponding processes implemented by the mobile terminal/terminal device in each method of the embodiments of the present application, which are not repeated here for brevity.

Embodiments of the present application also provide a computer program product, including computer program instructions.

Optionally, the computer program product can be applied to the network device in the embodiments of the present application, and the computer program instructions cause the computer to execute the corresponding processes implemented by the network device in each method of the embodiments of the present application, which are not repeated here for brevity.

Optionally, the computer program product can be applied to the mobile terminal/terminal device in the embodiments of the present application, and the computer program instructions cause the computer to execute the corresponding processes implemented by the mobile terminal/terminal device in each method of the embodiments of the present application, which are not repeated here for brevity.

The embodiments of the present application also provide a computer program.

Optionally, the computer program can be applied to the network device in the embodiments of the present application. When the computer program is executed on the computer, it causes the computer to execute the corresponding processes implemented by the network device in each method of the embodiments of the present application, which are not repeated here for brevity.

Optionally, the computer program may be applied to the mobile terminal/terminal device in the embodiments of the present application, and when the computer program is executed on the computer, it causes the computer to execute the corresponding processes implemented by the mobile terminal/terminal device in each method of the embodiments of the present application, which are not repeated here for brevity.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Those skilled in the art may implement the described functionality using different methods for each particular application, but such implementations should not be considered beyond the scope of this application.

Those skilled in the art can clearly understand that, for the convenience and brevity of description, the specific working process of the above-described systems, devices and units may refer to the corresponding processes in the foregoing method embodiments, which will not be repeated here.

In the several embodiments provided in this application, it should be understood that the disclosed system, apparatus and method may be implemented in other manners. For example, the apparatus embodiments described above are only illustrative. For example, the division of the units is only a logical function division. In actual implementation, there may be other division methods. For example, multiple units or components may be combined or may be integrated into another system, or some features can be ignored, or not implemented. On the other hand, the shown or discussed mutual coupling or direct coupling or communication connection may be through some interfaces, and the indirect coupling or communication connection of devices or units may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

In addition, each functional unit in each embodiment of the present application may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, the essence of the technical solution of the present application, or in other words the part that contributes to the prior art, or part of the technical solution, may be embodied in the form of a software product. The computer software product is stored in a storage medium, including several instructions to cause a computer device (which may be a personal computer, a server, or a network device, etc.) to execute all or part of the steps of the methods described in the various embodiments of the present application. The aforementioned storage medium includes: U disk, mobile hard disk, read-only memory (Read-Only Memory, ROM), random access memory (Random Access Memory, RAM), magnetic disk or optical disk and other media that can store program codes.

The above descriptions are merely specific embodiments of the present application, but the protection scope of the present application is not limited thereto. Any changes or substitutions easily conceivable to those skilled in the art within the technical scope disclosed in the present application should be covered by the protection scope of the present application. Therefore, the protection scope of the present application should be based on the protection scope of the claims.

What is claimed is:

1. A bandwidth part (BWP) configuration method, comprising:

receiving, by a terminal device, first configuration information sent by a network device, wherein the first configuration information comprises a plurality pieces of initial BWP configuration information, and each piece of initial BWP configuration information in the plurality pieces of initial BWP configuration information is associated with a terminal type and/or a terminal capability; and selecting, by the terminal device, first initial BWP configuration information from the plurality pieces of initial BWP configuration information based on the first configuration information, and residing on a first initial BWP based on the first initial BWP configuration information;

wherein different types of terminal types and/or terminal capabilities each corresponds to specific initial BWP configuration information which is not used for other types of terminal types and/or terminal capabilities.

2. The method according to claim 1, wherein the plurality pieces of initial BWP configuration information comprise configuration information of a plurality of uplink initial BWPs and configuration information of a plurality of downlink initial BWPs.

3. The method according to claim 2, wherein each initial BWP of the plurality of uplink initial BWPs and the plurality of downlink initial BWPs is associated with one piece of identification information, and different identification information is associated with different terminal types and/or or terminal capabilities.

4. The method according to claim 2, wherein each initial BWP of the plurality of uplink initial BWPs and the plurality of downlink initial BWPs comprises a BWP index.

5. The method according to claim 2, wherein the configuration information of the uplink initial BWP comprises:

bandwidth of the uplink initial BWP, subcarrier spacing of the uplink initial BWP, cyclic prefix of the uplink initial BWP, frequency point information of the uplink initial BWP, RACH common configuration information, PUCCH common configuration information, and PUSCH common configuration information.

6. The method according to claim 2, wherein the configuration information of the downlink initial BWP comprises:

bandwidth of the downlink initial BWP, subcarrier spacing of the downlink initial BWP, cyclic prefix of the downlink initial BWP, frequency point information of the downlink initial BWP, BCCH configuration information, PCCH configuration information, PDCCH common configuration information, and PDSCH common configuration information.

7. The method according to claim 1, wherein the selecting the first initial BWP configuration information from the plurality pieces of initial BWP configuration information comprises:

selecting, by the terminal device, the first initial BWP configuration information from the plurality pieces of initial BWP configuration information according to a first terminal type and/or a first terminal capability supported by the terminal device, and the first initial BWP configuration information is associated with the first terminal type and/or the first terminal capability.

8. The method according to claim 1, wherein the method further comprises:

initiating, by the terminal device, a random access procedure to the network device on the first initial BWP, wherein the first initial BWP is used by the network device to determine a first terminal type and/or a first terminal capability supported by the terminal device.

9. The method according to claim 1, wherein the first configuration information is carried in a second SIB.

10. The method according to claim 1, wherein the method further comprises:

receiving, by the terminal device, first indication information sent by the network device, wherein the first indication information is used to indicate whether a current cell supports a specific type of terminal device.

11. The method according to claim 10, wherein the first indication information is carried in a PBCH or an MIB or an SIB.

12. The method according to claim 1, wherein the method further comprises:

receiving, by the terminal device, second indication information and third indication information sent by the network device; wherein the second indication information is used to indicate whether a current cell allows access to a specific type of terminal device, and the third indication information is used to determine resource configuration information of a RMSI PDCCH.

13. The method according to claim 12, wherein the method further comprises:

receiving, by the terminal device, based on resource configuration information of a RMSI PDCCH, a second SI PDCCH, wherein the second SI PDCCH is used to schedule a second SIB;

wherein the receiving, by the terminal device, the first configuration information sent by the network device, comprises:

receiving, by the terminal device, the second SIB based on the second SI PDCCH, and obtaining the first configuration information from the second SIB.

14. The method according to claim 13, wherein the second SI PDCCH is descrambled using an SI-RNTI.

15. A BWP configuration method, comprising:

sending, by a network device, first configuration information to a terminal device, wherein the first configuration information comprises a plurality pieces of initial BWP configuration information, and each piece of initial BWP configuration information in the plurality pieces of initial BWP configuration information is associated with a terminal type and/or terminal capability;

wherein the first configuration information is used for the terminal device to select first initial BWP configuration information from the plurality pieces of initial BWP configuration information, and to reside on the first initial BWP based on the first initial BWP;

wherein different types of terminal types and/or terminal capabilities each corresponds to specific initial BWP configuration information which is not used for other types of terminal types and/or terminal capabilities.

16. The method according to claim 15, wherein the plurality pieces of initial BWP configuration information comprise configuration information of a plurality of uplink initial BWPs and configuration information of a plurality of downlink initial BWPs.

17. The method according to claim 16, wherein each initial BWP in the plurality of uplink initial BWPs and the plurality of downlink initial BWPs is associated with one piece of identification information, and different identification information is associated with different terminal types and/or or terminal capabilities.

18. A terminal device, comprising:

a processor and a memory;

wherein the memory is configured to store a computer program, and the processor is configured to invoke and execute the computer program stored in the memory, to perform:

receiving first configuration information sent by a network device, wherein the first configuration information comprises a plurality pieces of initial BWP configuration information, and each piece of initial BWP configuration information in the plurality pieces of initial BWP configuration information is associated with a terminal type and/or a terminal capability; and selecting first initial BWP configuration information from the plurality pieces of initial BWP configuration information based on the first configuration information, and residing on a first initial BWP based on the first initial BWP configuration information;

wherein different types of terminal types and/or terminal capabilities each corresponds to specific initial BWP configuration information which is not used for other types of terminal types and/or terminal capabilities.

19. A network device, comprising:

a processor and a memory;

wherein the memory is configured to store a computer program, and the processor is configured to invoke and execute the computer program stored in the memory, to perform:

sending first configuration information to a terminal device, wherein the first configuration information comprises a plurality pieces of initial BWP configuration information, and each piece of initial BWP configuration information in the plurality pieces of initial BWP configuration information is associated with a terminal type and/or terminal capability;

wherein the first configuration information is used for the terminal device to select first initial BWP configuration information from the plurality pieces of initial BWP configuration information, and to reside on the first initial BWP based on the first initial BWP;

wherein different types of terminal types and/or terminal capabilities each corresponds to specific initial BWP configuration information which is not used for other types of terminal types and/or terminal capabilities.

* * * * *